(12) United States Patent
K N et al.

(10) Patent No.: US 12,401,722 B2
(45) Date of Patent: Aug. 26, 2025

(54) METHOD AND SYSTEM FOR DEVICE CAPABILITY AND TRANSFER USING DYNAMIC CONTEXT AWARE NEGOTIATION

(71) Applicant: Dell Products L.P., Round Rock, TX (US)

(72) Inventors: Ravishankar K N, Bengaluru (IN); Prasad Rao, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/429,569

(22) Filed: Feb. 1, 2024

(65) Prior Publication Data

US 2025/0254217 A1    Aug. 7, 2025

(51) Int. Cl.
*H04L 67/125* (2022.01)
*H04L 67/51* (2022.01)

(52) U.S. Cl.
CPC .......... *H04L 67/125* (2013.01); *H04L 67/51* (2022.05)

(58) Field of Classification Search
CPC ............................ H04L 67/125; H04L 67/51
See application file for complete search history.

(56) References Cited

U.S. PATENT DOCUMENTS

| | | | |
|---|---|---|---|
| 8,355,926 B1 * | 1/2013 | Hinz | G06Q 10/10 705/2 |
| 2021/0119874 A1 * | 4/2021 | Ryman | H04L 67/025 |
| 2025/0117512 A1 * | 4/2025 | Gore | G06F 21/6245 |

* cited by examiner

*Primary Examiner* — Minh Chau Nguyen
(74) *Attorney, Agent, or Firm* — Terrile, Cannatti & Chambers, LLP; Emmanuel A. Rivera

(57) ABSTRACT

Described herein are methods and a system device management of multiple tools or consoles in a data center, where the consoles control devices in the data center. The consoles are identified with unique identifiers. A capability list of devices in the data center, a provider policy as to the multiple consoles, and a grant matrix as to device capability and consoles is used by a baseboard management controller of a device to determine control of a console over the device.

20 Claims, 8 Drawing Sheets

METHOD AND SYSTEM FOR DEVICE CAPABILITY AND TRANSFER USING DYNAMIC CONTEXT AWARE NEGOTIATION

BACKGROUND OF THE INVENTION

Field of the Invention

The present invention relates to managing devices in data center. More specifically, embodiments of the invention provide for determining products, such as consoles, to manage such devices through dynamic context aware negotiation which determines capability of the devices.

Description of the Related Art

In a customer data center, there exists multiple devices, such as storage servers. Such devices can be managed or controlled through a service oriented architecture (SOA) providing discrete services. An example, of such a SOA supports storage server management. The storage devices can be deployed as edge devices in the data center of a customer site. Included in the storage server management is a product life cycle of the storage servers/devices, which include determining commissioning, installing, repairing, updating, replacing, etc. of devices, including hardware, firmware, and software.

The devices can implement an interface (e.g., proprietary application program interface/API). The interface can be to a tool, such a console (i.e., management console). Such tools/consoles can be used for power management, collecting data, analyzing updates, etc. Workflows can be initiated from a tool/console to a device.

In a unified management SOA, there can be multiple management consoles. The multiple management consoles can have different and competing use cases. For example, there can be a tool/console that manages life cycle of devices (e.g., storage servers), that includes updates, firmware/patch, add new server/hardware/device, etc. there can be another tool/console used for power monitoring.

If one tool/console makes changes to a device, the change can be disruptive to other devices and the data center environment. Workflow triggered by one console can potentially lead to undesirable failures and downtime affecting customer workloads and SLA (service level agreement). Compute resources running critical workloads may not protected from unauthorized interference by management consoles if the management consoles are allowed access to the computing resources.

In a unified management SOA, the challenge is the use and coexistence of multiple tools/management consoles, without negatively affecting workflow, workload and operation of devices (e.g., storage servers) in a customer data center. How can multiple tools/products/consoles coexist with other tools/products/consoles to be able to manage hardware/devices without negatively impacting one another?

SUMMARY OF THE INVENTION

A computer-implementable method, system and computer-readable storage medium for device management of multiple consoles in a data center comprising identifying the multiple consoles and assigning unique identifiers to each console; providing a capability list of devices in the data center; configuring a provider policy as to the multiple consoles; implementing a grant matrix as to device capability and consoles; and downloading and implementing the grant matrix at a baseboard management controller of device to be implemented with a data model at the device to determine control of a console using console identifier, capability list, and provider policy.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments provide a data model, such as common information model (CIM) to be used in or with a baseboard management controller (BMC) of device, to be used with a device capability-access orchestrator (DCAO) service for dynamic contextual access configuration of devices in a data center.

The platform implemented in the data center can be a service oriented architecture (SOA) that manages a suite of tools or consoles. The consoles are used to control the devices of the data center.

The data model and its components are defined and persisted on the on the BMC and used by the DCAO service is used to resolve contention among the consoles in managing the devices, and to particular console affinity to desired devices.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
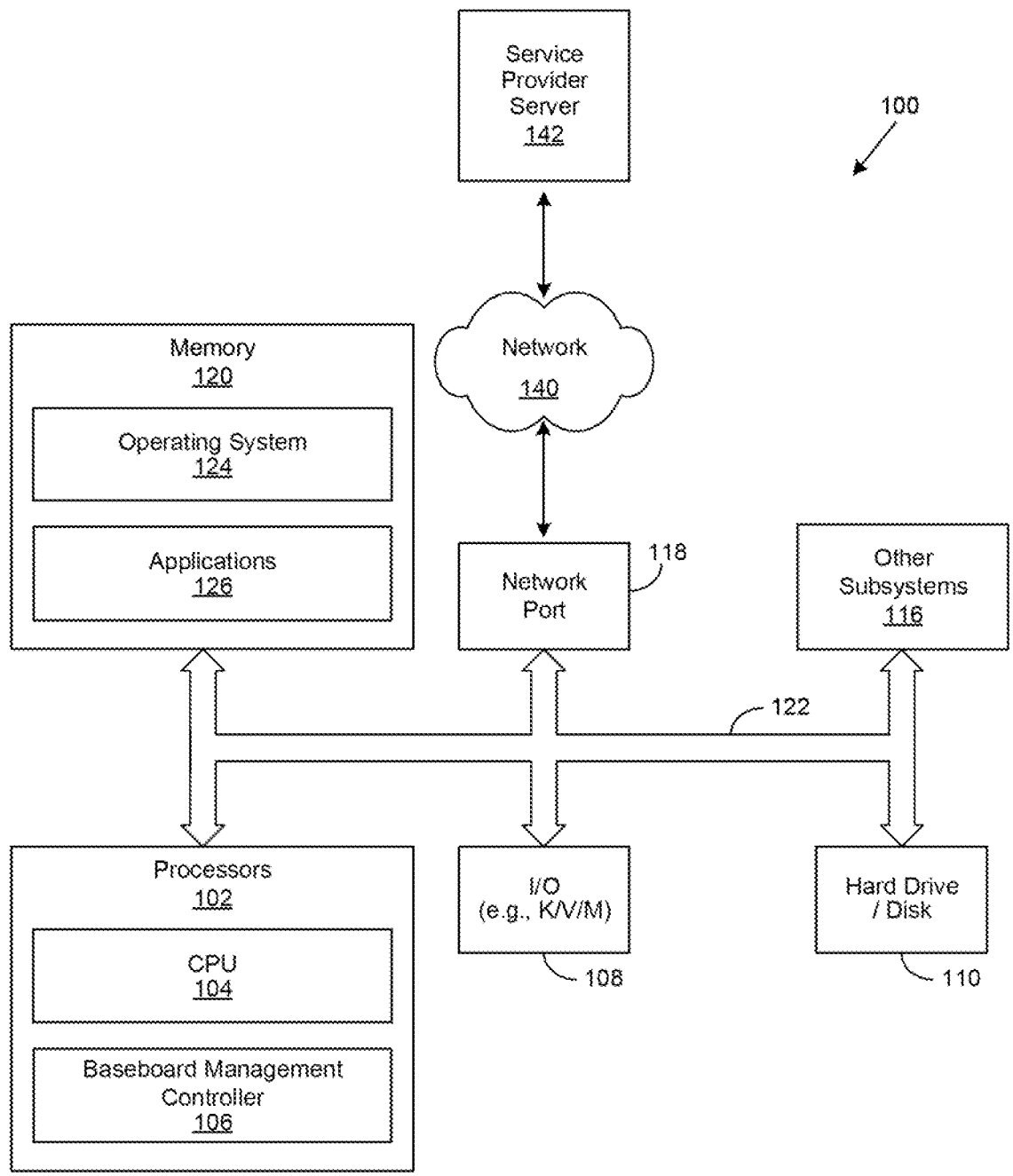
FIG. 1 is a general illustration of components of an information handling system as implemented in the present invention.

FIG. 1 is a generalized illustration of an information handling system (IHS) 100 that can be used to implement the system and method of the present invention. The information handling system (IHS) 100 includes processors 102, such as a central processor unit or "CPU" 104 and baseboard management controller (BMC) 106. The IHS 100 can further include input/output (I/O) devices 108, such as a microphone, a keyboard, a video display or display device, a mouse, and associated controllers (e.g., K/V/M), a hard drive or disk storage 114, and various other subsystems 116.

In various embodiments, the information handling system (IHS) 100 also includes network port 118 operable to connect to a network 140, where network 140 can include one or more wired and wireless networks, including the Internet. Network 140 is likewise accessible by a service provider server 142.

The information handling system (IHS) 100 likewise includes system memory 120, which is interconnected to the foregoing via one or more buses 122. System memory 120 can be implemented as hardware, firmware, software, or a combination of such. System memory 120 further includes an operating system (OS) 124 and applications 126.

Figure 2:
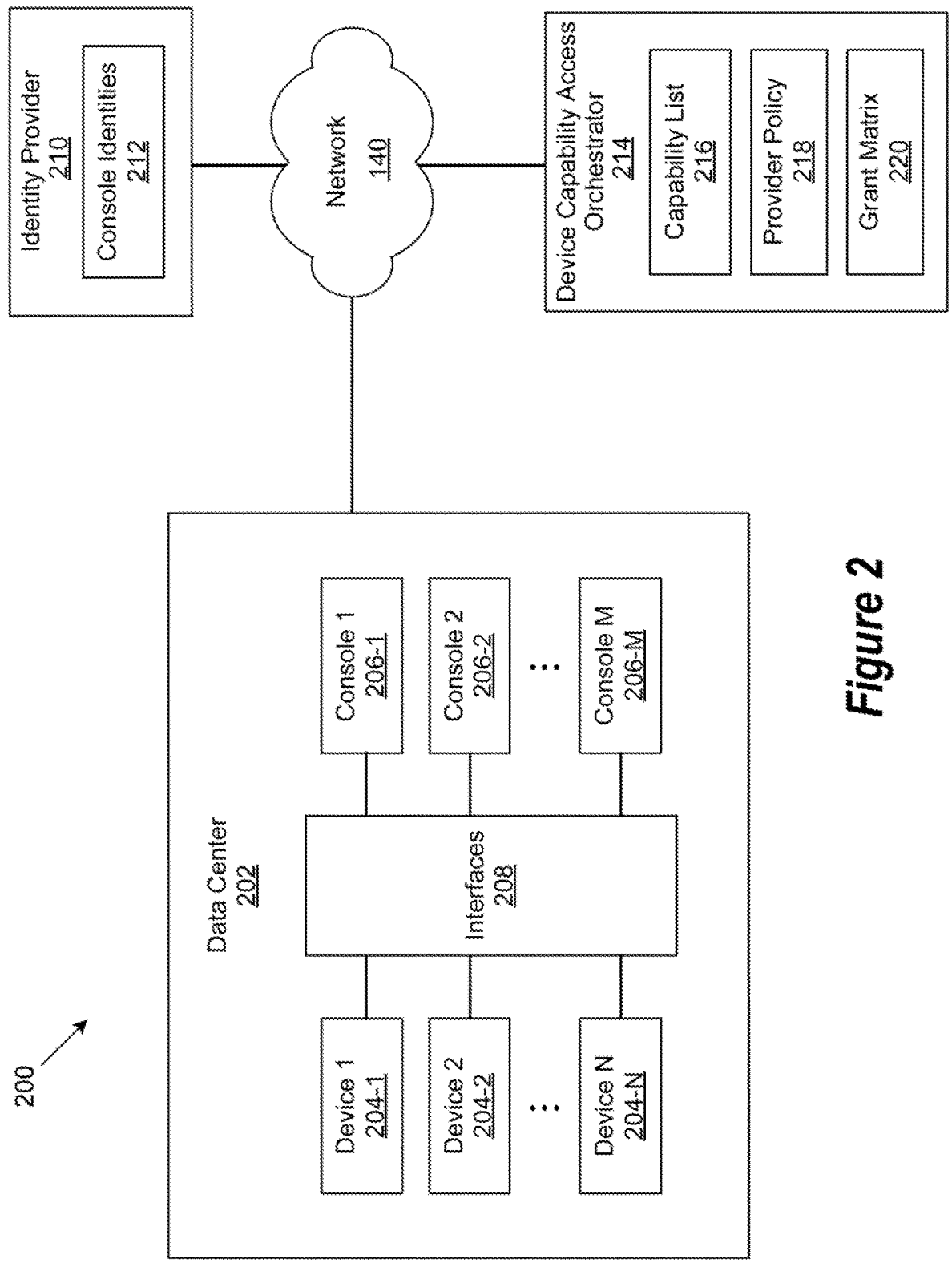
FIG. 2 is a system as implemented in the present invention.

FIG. 2 shows a system 200 that supports the processes described herein. Various implementations provide for the system 200 to a data center 202. The data center 202 can be located at a customer site and administered by a customer. Embodiments provide for the data center 202 to include multiple devices, device 1 204-1 to device N 204-N. Examples of devices 204 include edge devices, such as storage servers. Devices 204 further can be implemented as information handling system 100 as described in FIG. 1.

Implementations provide for the data center 202 to include multiple tools, such as consoles, represented as console 1-206-1 to console M 206-M, Consoles 206 can be part of service oriented architecture (SOA). Consoles 206 can be used for power management, collecting data, analyzing updates, etc. of devices 204. Workflows can be initiated from a console 206 to a device 204. Consoles 206 can have different and competing use cases, such as managing life cycle of devices 204), that includes updates, firmware/patch, add new server/hardware/device, etc.

Consoles 206 can be connected to and communicate with the devices 204 through an interface(s), such as proprietary application program interfaces (API), as represented by interfaces 208. Implementations provide for an exchange of credentials for consoles 206 to connect and communicate with devices 204.

Implementations provide for the data center 202, and its components e.g., devices 204, consoles 206) to connect with network 140. As discussed, the network 104 can include one or more wired and wireless networks, including the Internet.

Implementations provide for the system 200 to include an identity provider 210. The identity provider 210 is connected to other components of the system 200 through network 140. The identity provider 210 can a service (i.e., web service), and generate (provide) unique identities for each of the consoles 206. Identity provider 210 can also validate the identities upon request. A store (database) for the console identities, represented by console identities 212, can be included or accessed by identity provider 210.

Implementations provide for the system 200 to include a device capability-access orchestrator (DCAO) 214. The DCAO 214 is connected to other components of the system 200 through network 140. The DCAO 214 can a service (i.e., web service) that provides the following.

The DCAO 214 understands capability of the devices 204, and in certain implementations orchestrates assignment of capabilities of devices 204 to particular consoles 206 with independent identities. Implementations can provide for the DCAO 214 to include a "capability list." The capability list can represent a superset that can be queried, of device 204 capabilities, that can include update read, update write, SCP read, SCP write, etc. Several capabilities can also be grouped into larger capability-sets. Furthermore, devices 204 can be defined in any way or in degree of granularity as to capabilities.

The DCAO 214 can include and configure a "provider policy." The provider policy defines an ownership hierarchy that includes cluster managers, such as virtual center, system center, infrastructure, etc. The provider policy further defines the applicable consoles 206 to cluster managers. Console 206 ability to support device 204 capabilities can be vetted by the provider policy in conjunction with device 204 specific grants.

Figure 3:
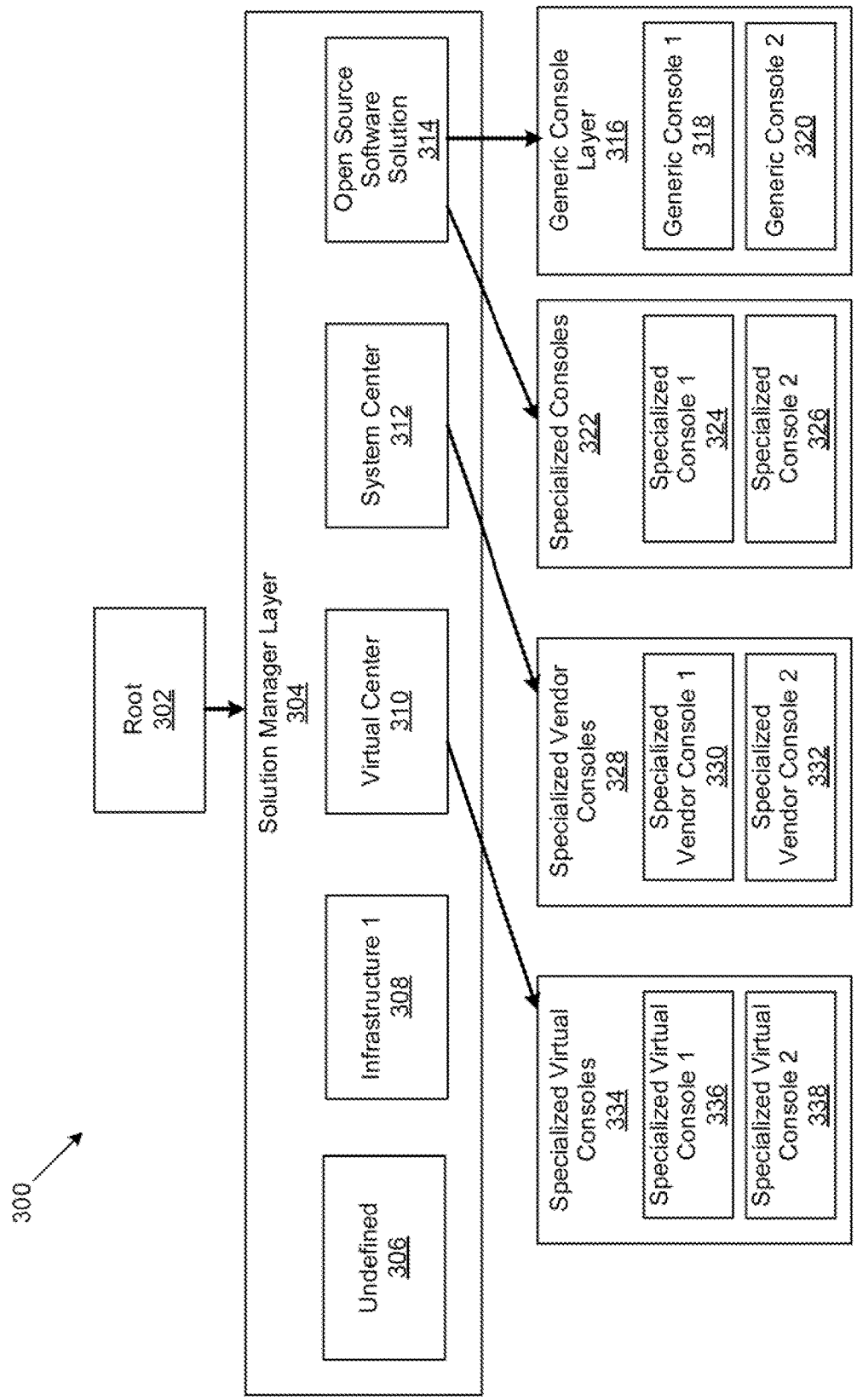
FIG. 3 is provider policy.

FIG. 3 shows an example provider policy 300. A high level root box 302 points to a solution manager layer 304. The solution manager layer 304 includes the following cluster managers: undefined 306, infrastructure 1 308, virtual center 310, system center 312, an open source software (OSS) solution 314.

OSS solution 314 points to generic console layer 316 that includes generic console 1 318 and generic console 2 320. OSS solution 314 points to specialized consoles 322 that include specialized console 1 324 and specialized console 1 326. System center 312 points to a specialized vendor consoles 328 that include specialized vendor console 330 and specialized vendor console 332. Virtual center 310 points to specialized virtual consoles 334 that include specialized virtual console 336 and specialized virtual console 338.

Referring back to FIG. 2, the DCAO 214 further can provide for a "grant matrix". The grant matrix can be implemented as a grid with a one axis being device 204 capabilities and the other axis being consoles 206 that can interact with the devices 204. In various implementations, devices 204 include a data model, such as common information model (CIM), which can be included as an application in applications 126 or in memory 120 (e.g., firmware) of IHS 100. The data model can be integrated with the baseboard management controller (BMC) 106, where the BMC 106 is a specialized service processor that monitors the physical state of IHS 100 (i.e., device 204).

The grant matrix is embedded in the device 204 through the BMC 106. The device 204 should be able to deny or accept request for particular consoles 206 to make changes/control the device, even if consoles 206 have proper credentials. The DCAO 214 will read/write to the grant matrix of the BMC 106 of the device to allow the device to decide which console 206 can control.

Implementations provide for grant matrix to include a mapping of a chain of registered/identified consoles 206 against a device 204 capabilities persisted by the BMC 106. The chain of registered/identified consoles 206 can be an ordered list of registered/identified consoles 206 with the last entry ($C_n$) being the current owner of the device 204 capability. If console $C_n$ deregisters from device 204 capability, ownership passes to the previous entry ($C_{n-1}$) in the list. Console $C_{n-1}$ can relinquish the capability in favor of any other console which becomes the next entry in the chain ($C_{n+1}$).

In general, an example workflow is a follows. A solution manager for each device 204 can be implemented. It can be assumed that a solution manager identity is encoded in a BMC 106 through in-band agents when applicable, or the solution manager can be undefined when no solution manager is configured. ccc A user/administrator of a data center 202 defines a provider policy through the DCAO 214. Specific device 204 capabilities will be configurable as a policy for each Solution Manager. Solution manager may allow/disallow all/partial capabilities to any participating console 206.

BMC 106 will define a data model (e.g., CIM) for the grant matrix that encodes a chain of registered consoles 206. Encoding a console 206 into the grant matrix can include the following. Applicability of the console 206 based on the provider policy configured in DCAO 214. No console 206 encoded in the grant matrix for the requested capability. Currently encoded console 206 relinquishes control to a new console 206.

Consoles 206 negotiate for capability with the DCAO 214. Success indicates a grant, and a console 206 becomes an owner of the capability, and BMC 106 of the device 204 will refuse capability with other console identities. If DCAO 214 responds with a "negotiate" response, console will be expected to request current owning console 206 to relinquish the capability. The DCAO 214 will query and write the grant matrix into BMC 106.

Figure 4:
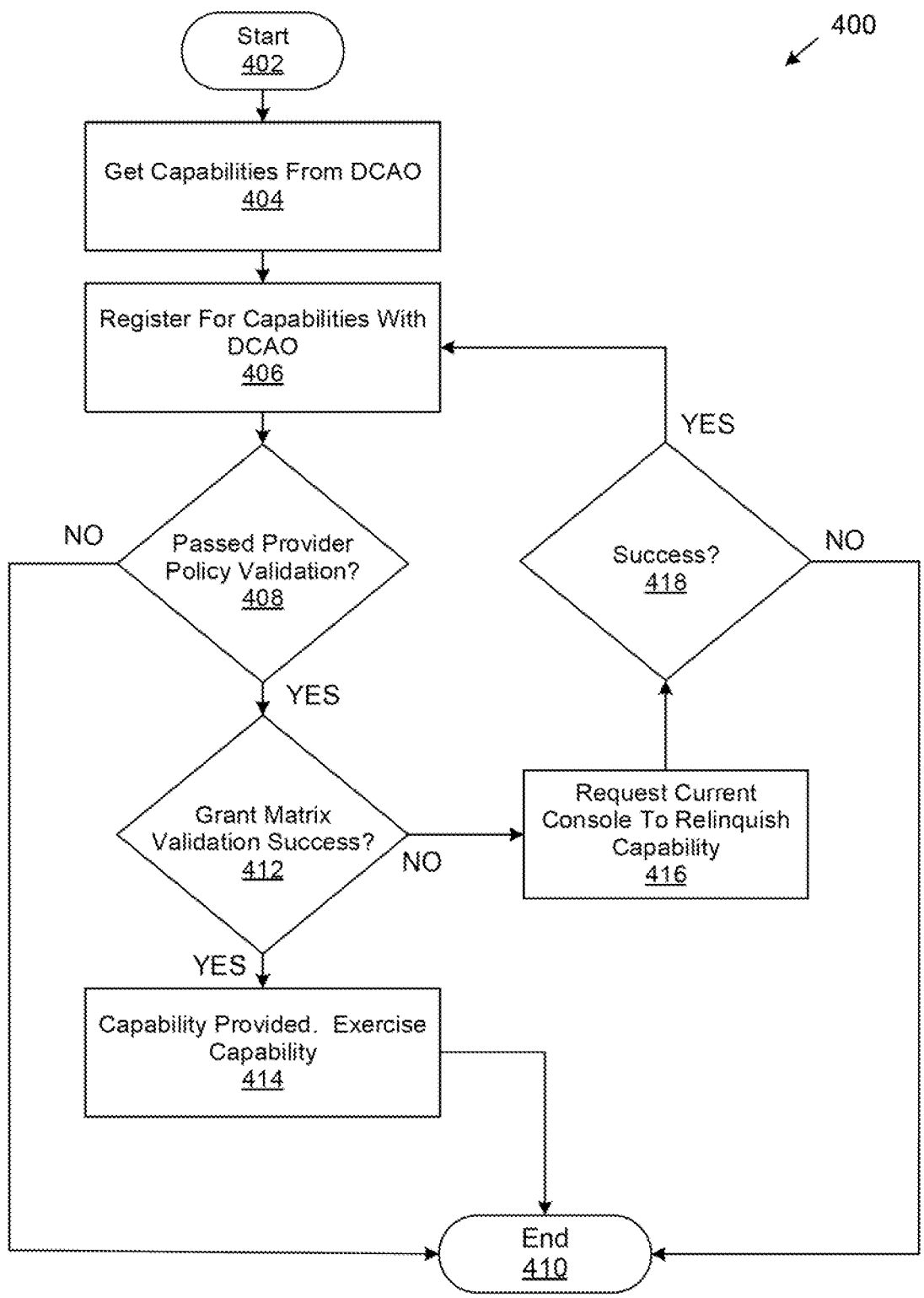
FIG. 4 is a generalized flowchart for generating request based tokens to grant capability transfer by console.

FIG. 4 shows a generalized flowchart for generating request based tokens to grant capability transfer by console. The use of request based tokens is further described below. Implementations provide for the steps of process 400 to be performed by a console 206. The order in which the method is described is not intended to be construed as a limitation, and any number of the described method steps may be combined in any order to implement the method, or alternate method. Additionally, individual steps may be deleted from the method without departing from the spirit and scope of the subject matter described.

At step 402, the process 400 starts. At step 404, device capabilities a requested from the DCAO 214. At step 406 registering for the device capabilities is performed with the DCAO 214.

If the console does not pass provider policy validation, following the "NO" branch of step 408, at step 410 the process 400 ends. If the console does pass provider policy validation, following the "YES" branch of step 408, a determination is performed if grant matrix validation is successful at step 412. If grant matrix validation is successful, following the "YES" branch of step 412, at step 414 capability is provided to the console, and capability can be exercised. At step 410, the process ends.

If grant matrix validation is successful, following the "YES" branch of step 412, at step 416 a request of the current console to relinquish capability to another console is performed. This can be through the use of request based tokens.

If relinquish capability is successful, following the "YES" branch of step 418, step 406 is performed. If relinquish capability is not successful, following the "NO" branch of step 418, at step 410, the process ends.

Figure 5:
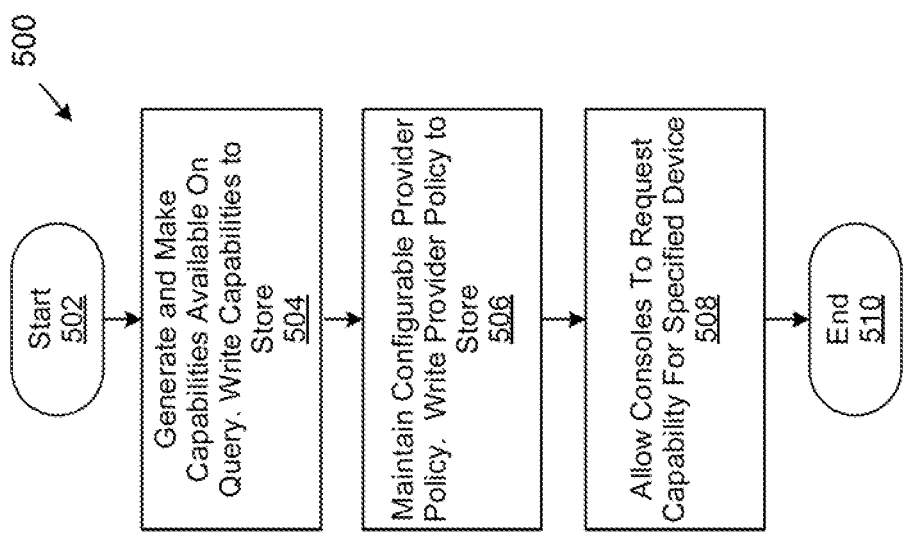
FIG. 5 is a generalized flowchart for operation of a device capability-access orchestrator (DCAO) as to writing a grant matrix to BMCs of devices.

FIG. 5 shows a generalized flowchart for operation of a device capability-access orchestrator (DCAO) as to writing a grant matrix to BMCs of devices. Implementations provide for the steps of process 500 to be performed by DCAO 214. The order in which the method is described is not intended to be construed as a limitation, and any number of the described method steps may be combined in any order to implement the method, or alternate method. Additionally, individual steps may be deleted from the method without departing from the spirit and scope of the subject matter described.

At step 502, the process 500 starts. At step 504, device capabilities are generated and made available upon query. The device capabilities are written to a store. At step 506, configurable provider policy is maintained. The provider policy can be written to the store. At step 508, consoles are allowed to request capability for specific devices. At step 510, the process 500 ends.

Figure 6:
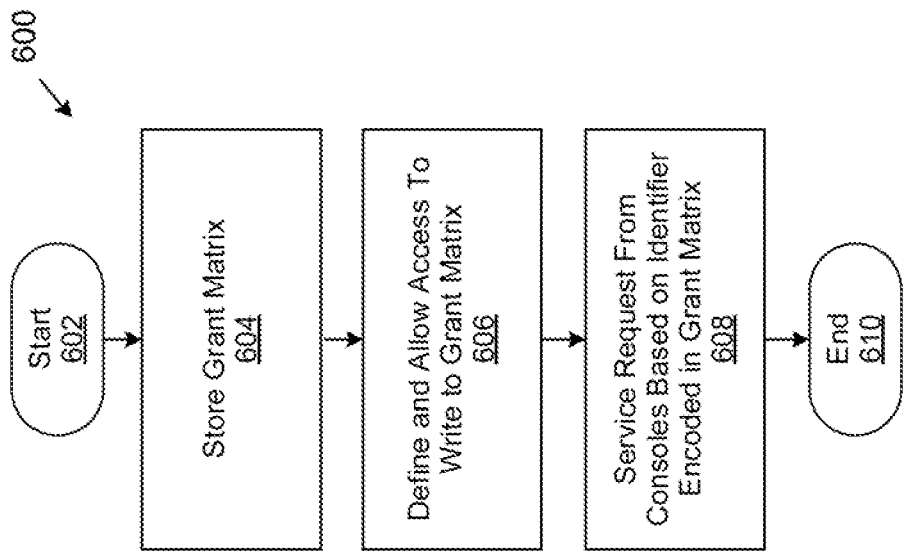
FIG. 6 is a generalized flowchart for operation of a baseboard management controller (BMC)

FIG. 6 shows a generalized flowchart for operation of a baseboard management controller (BMC). Implementations provide for the steps of process 600 to be performed by BMC 106. The order in which the method is described is not intended to be construed as a limitation, and any number of the described method steps may be combined in any order to implement the method, or alternate method. Additionally, individual steps may be deleted from the method without departing from the spirit and scope of the subject matter described.

At step 602, the process 600 starts. At step 604, grant matrix is stored. At step 606, the grant matrix is defined, and access to the DCAO 214 is allowed to write to the grant matrix. At step 608, service requests from consoles with identifiers are stored in grant matrix based on the identifiers. At step 610, the process 600 ends.

Figure 7:
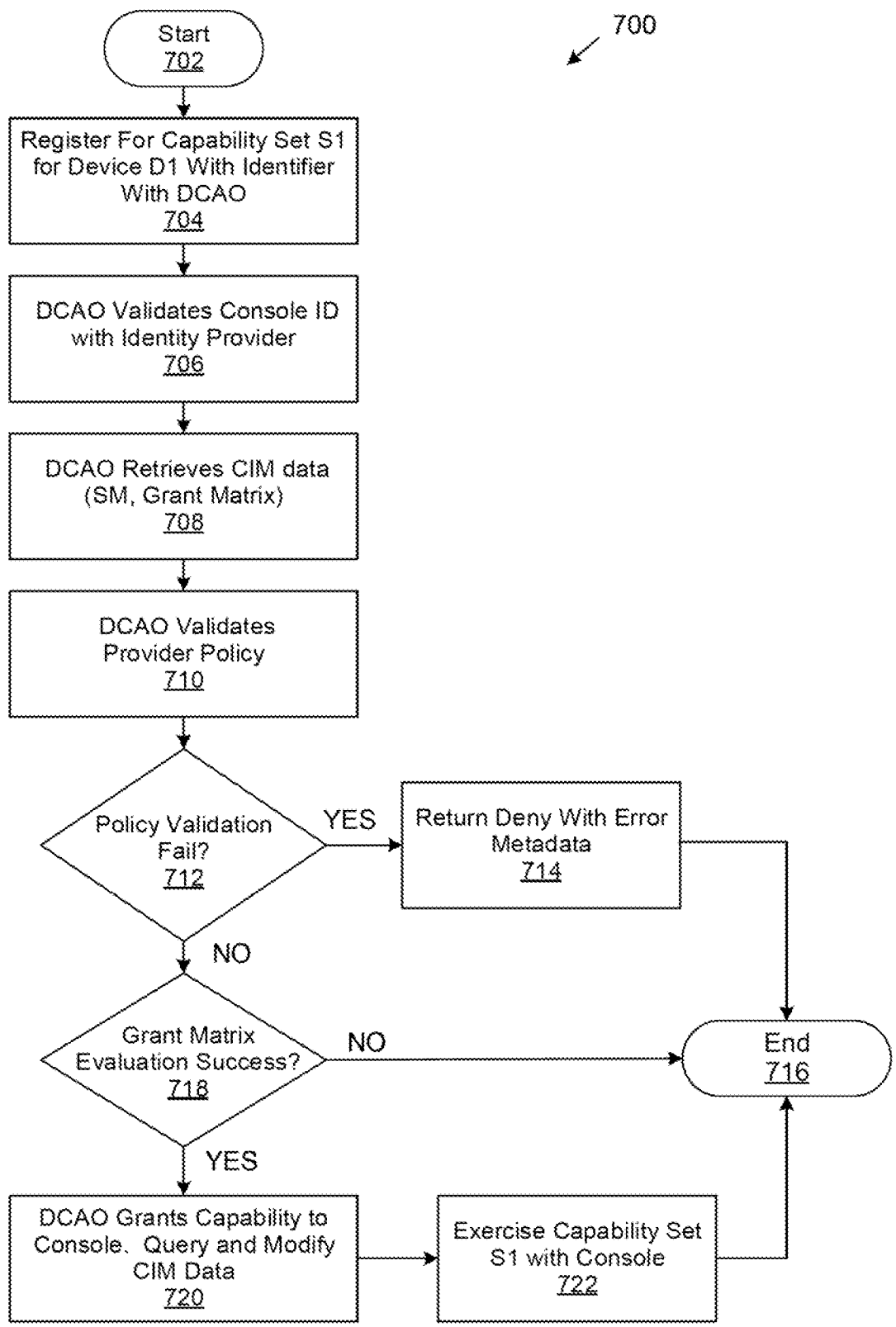
FIG. 7 is a generalized flowchart for dynamic device ownership and access negotiation for consoles.

FIG. 7 shows a generalized flowchart for dynamic device ownership and access negotiation for consoles. The consoles 206 are registered with the identity provider 210 as described above. Process 700 is directed to a console 206 to exercise capability for set S1 for a device 1 (e.g., a device 204) The order in which the method is described is not intended to be construed as a limitation, and any number of the described method steps may be combined in any order to implement the method, or alternate method. Additionally, individual steps may be deleted from the method without departing from the spirit and scope of the subject matter described.

At step 702, the process 700 starts. At step 704, the console registers for a capability set S1 for a device D1, with the console identifier with the DCAO 214. Capability set S1 can be codified for the console 206.

At step 706, the DCAO 214 validates the console identifier with the identity provider 210. At step 708, the DCAO 214 retrieves from a BMC 106 of a device 204, data model data, such as common information model (CIM) data, that can include solution manager and grant matrix. At step 710, the DCAO 214 validates resident provider policy.

If policy provider validation fails, following the "YES" branch of step 712, at step 714 the DCAO 214 returns to the console 206, a "deny" message with error metadata. At step 716, the process 700 ends. If the policy provider validation does not fail, following the "NO" branch of step 712, at step 718, a determination is performed if a grant matrix evaluation is successful.

If the grant matrix grant matrix evaluation is not successful, following the "NO" branch of step 718, at step 716, the process 700 ends. If the grant matrix grant matrix evaluation is successful, following the "YES" branch of step 718, at step 720, DCAO 214 grants capability to the console 206. The DCAO 214 queries and modifies the CIM data in the BMC 106 of device 204. At step 722, the DCAO 214 grants capability set S1 to the console 206. At step 716, the process 700 ends.

Figure 8:
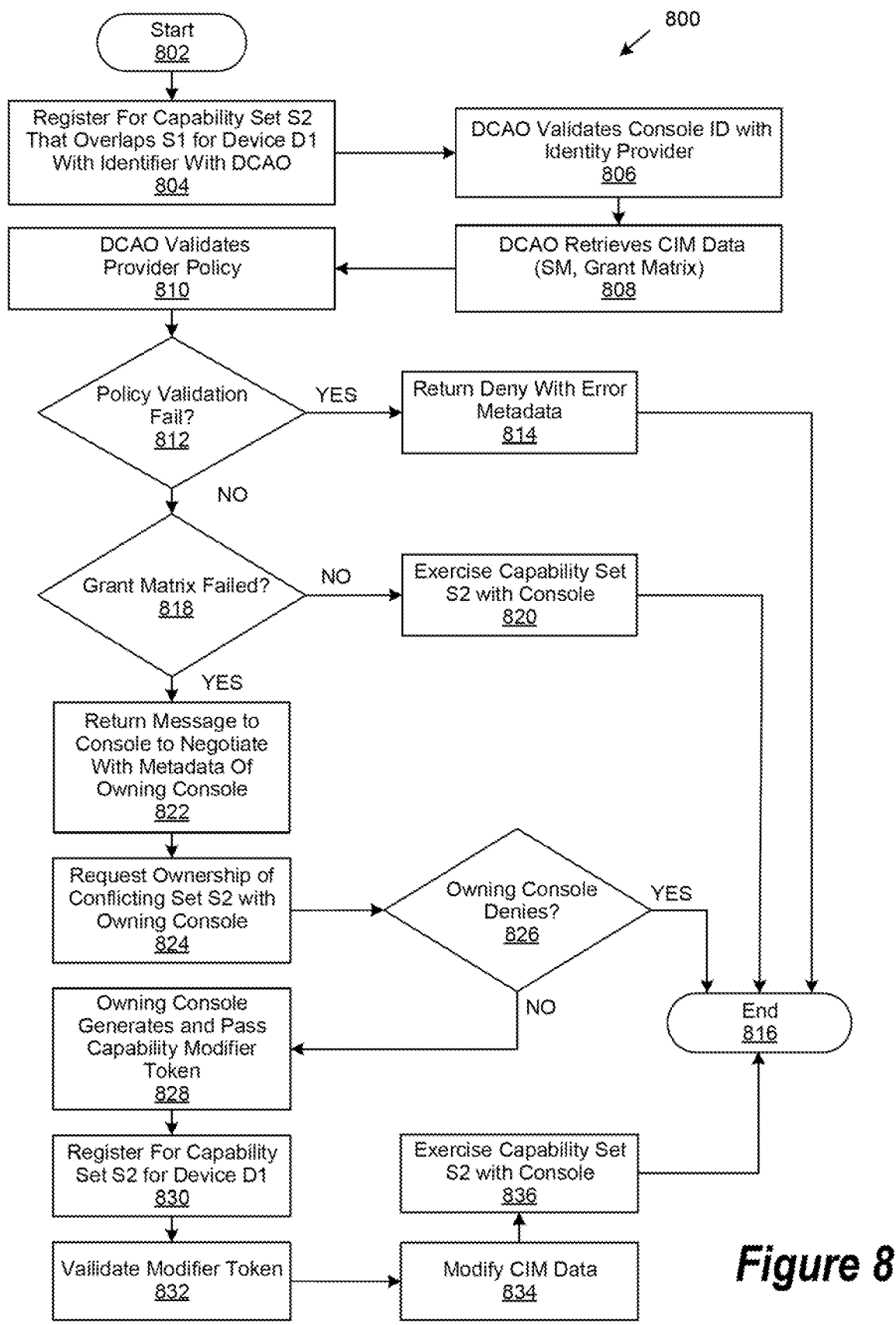
FIG. 8 is a generalized flowchart for dynamic device ownership and access negotiation between two consoles.

FIG. 8 shows a generalized flowchart for dynamic device ownership and access negotiation between two consoles. The consoles 206 are registered with the identity provider 210 as described above. Process 800 is directed to a first console 206 and a second console 206, for the second console to exercise a capability set S2 that completely or partially overlaps a capability set S1 for a device 1 (e.g., a device 204). The order in which the method is described is not intended to be construed as a limitation, and any number of the described method steps may be combined in any order to implement the method, or alternate method. Additionally, individual steps may be deleted from the method without departing from the spirit and scope of the subject matter described.

At step 802, the process 800 starts. At step 804, the second console registers for capability set S2 that completely or partially overlaps a capability set S1 for the device 1, with a console identifier with the DCAO 214. At step 806, the DCAO 214 validates the console identifier of the second console with the identity provider 210.

At step 808, the DCAO 214 retrieves from BMC 106 of device 1 (e.g., a device 204), data model data, such as common information model (CIM) data, that can include solution manager and grant matrix. At step 810, the DCAO 214 validates resident provider policy.

If policy provider validation fails, following the "YES" branch of step 812, at step 814 the DCAO 214 returns to the second console 206, a "deny" message with error metadata. At step 816, the process 800 ends. If the policy provider validation does not fail, following the "NO" branch of step 812, at step 818, a determination is performed if a grant matrix evaluation is successful or has failed.

If the grant matrix evaluation has not failed, following the "NO" branch of step 818, at step 820, the capability set S2 is exercised with console 2. At step 816, the process 800 ends.

If the grant matrix evaluation has failed, following the "YES" branch of step 818, at step 822, the DCAO 214 returns to the second console 206, a message with metadata, to the owning console 1 to negotiate. At step 824, the console 2 requests ownership of capability set S2 with owing console 1. If owning console 1 denies ownership of capability set S2, following the "YES" branch of step 826, at step 816, the process 800 ends.

If owning console 1 does not deny ownership of capability set S2, following the "NO" branch of step 826, at step 828, owning console 1 generates and passes to console 2 a capability modifier token. At step 830, the console 2 registers with the DCAO 214, capability set S2 that completely or partially overlaps a capability set S1 for the device 1 and passes the capability modifier token to DCAO 214.

At step 832, the DCAO 214 validates the capability modifier token with console 1. If token validation and grant matrix validation is successful, at step 834, the DCAO 214 modifies the CIM data with the grant matrix in the BMC 106 of device 204. At step 836, the capability set S2 is exercised with the console 2. At step 816, the process 800 ends.

Figure 9:
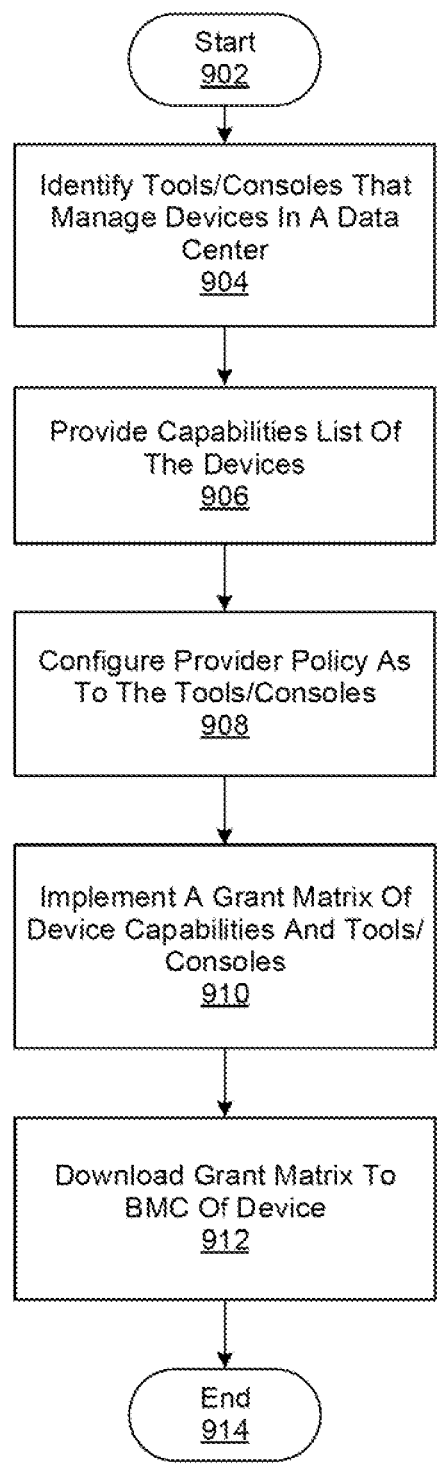
FIG. 9 is a generalized flowchart for device management of multiple tools/consoles in data center.

FIG. 9 shows generalized flowchart for device management of multiple tools/consoles in a data center. Implementations provide for the steps of process 900 to be performed by the system 200. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 904, the tools or consoles 206 of data center 202 are identified and provided unique identifiers by identifier provider 210. At step 906, a capabilities list of the devices 204 of the data center 202 is provided by DCAO 214. At step 908, the DCAO 214 configures a provider policy as to the consoles 206. At step 910, the DCAO 214 implements a grant matrix of device 204 capabilities and consoles 206, At step 912, the grant matrix is downloaded to a BMC 106 of a device 204. At step 914, the process 900 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for device management of multiple consoles in a data center comprising:
    identifying the multiple consoles and assigning unique identifiers to each console;
    providing a capability list of devices in the data center;
    configuring a provider policy as to the multiple consoles;
    implementing a grant matrix as to device capability and consoles; and
    downloading and implementing the grant matrix at a baseboard management controller of device to be implemented with a data model at the device to determine control of a console using console identifier, capability list, and provider policy.

2. The computer-implementable method of claim 1 further comprising dynamic device ownership and access negotiation between consoles.

3. The computer-implementable method of claim 2, wherein token exchange and validation is implemented.

4. The computer-implementable method of claim 1, wherein the device management is a service oriented architecture (SOA) platform.

5. The computer-implementable method of claim 1, wherein the capability list is superset of device capabilities that can be queried.

6. The computer-implementable method of claim 1, wherein the provider policy defines an ownership hierarchy that includes cluster managers.

7. The computer-implementable method of claim 1, wherein the grant matrix includes a mapping of a chain of identified consoles against capabilities of a device.

8. A system comprising:
    a plurality of processing systems communicably coupled through a network, wherein the processing systems include non-transitory, computer-readable storage medium embodying computer program code interacting with a plurality of computer operations for device management of multiple consoles in a data center comprising:
    identifying the multiple consoles and assigning unique identifiers to each console;
    providing a capability list of devices in the data center;
    configuring a provider policy as to the multiple consoles;
    implementing a grant matrix as to device capability and consoles; and
    downloading and implementing the grant matrix at a baseboard management controller of device to be implemented with a data model at the device to determine control of a console using console identifier, capability list, and provider policy.

9. The system of claim 8 further comprising dynamic device ownership and access negotiation between consoles.

10. The system of claim 9, wherein token exchange and validation is implemented.

11. The system of claim 8, wherein the device management is a service oriented architecture (SOA) platform.

12. The system of claim 8, wherein the capability list is superset of device capabilities that can be queried.

13. The system of claim 8, wherein the provider policy defines an ownership hierarchy that includes cluster managers.

14. The system of claim 8, wherein the grant matrix includes a mapping of a chain of identified consoles against capabilities of a device.

15. A non-transitory, computer-readable storage medium embodying computer program code for device management of multiple consoles in a data center, the computer program code comprising computer executable instructions configured for:
    identifying the multiple consoles and assigning unique identifiers to each console;
    providing a capability list of devices in the data center;
    configuring a provider policy as to the multiple consoles;
    implementing a grant matrix as to device capability and consoles; and
    downloading and implementing the grant matrix at a baseboard management controller of device to be implemented with a data model at the device to determine control of a console using console identifier, capability list, and provider policy.

16. The non-transitory, computer-readable storage medium of claim 15, wherein the device management is a service oriented architecture (SOA) platform.

17. The non-transitory, computer-readable storage medium of claim 15, wherein the capability list is superset of device capabilities that can be queried.

18. The non-transitory, computer-readable storage medium of claim 15, wherein the provider policy defines an ownership hierarchy that includes cluster managers.

19. The non-transitory, computer-readable storage medium of claim 15, wherein the grant matrix includes a mapping of a chain of identified consoles against capabilities of a device.

20. The non-transitory, computer-readable storage medium of claim 15 further comprising dynamic device ownership and access negotiation between consoles.

* * * * *